United States Patent
Adams et al.

(10) Patent No.: US 6,167,993 B1
(45) Date of Patent: Jan. 2, 2001

(54) BRAKING SYSTEM WITH A HYDRODYNAMIC RETARDER

(75) Inventors: Werner Adams, Crailsheim; Peter Heilinger, Satteldorf, both of (DE)

(73) Assignee: Voith Turbo GmbH, Heidenheim (DE)

( * ) Notice: Under 35 U.S.C. 154(b), the term of this patent shall be extended for 454 days.

(21) Appl. No.: 08/581,950

(22) Filed: Jan. 2, 1996

(30) Foreign Application Priority Data

Dec. 30, 1994 (DE) .................................................. 44 47 166

(51) Int. Cl.⁷ ....................................................... B60T 10/02
(52) U.S. Cl. ............................................................. 188/296
(58) Field of Search .................................. 188/296, 293, 188/140 A; 192/58 R; 477/183, 184, 203–209

(56) References Cited

U.S. PATENT DOCUMENTS

| | | | |
|---|---|---|---|
| 3,650,358 | * 3/1972 | Bessier ................................. | 188/296 |
| 3,720,372 | 3/1973 | Jacobs ................................. | 237/12.3 |
| 3,989,127 | * 11/1976 | Staudenmaier et al. ............. | 188/296 |
| 4,276,970 | * 7/1981 | Herrmann et al. .................... | 188/296 |
| 4,726,255 | 2/1988 | Humpfer et al. ...................... | 74/688 |
| 4,773,513 | * 9/1988 | Herrmann et al. .................... | 188/296 |
| 5,090,523 | * 2/1992 | Vogelsang ............................. | 188/296 |
| 5,333,707 | * 8/1994 | Kaneda ................................. | 188/296 |

FOREIGN PATENT DOCUMENTS

| | | |
|---|---|---|
| 1 946 167 | 3/1970 | (DE) . |
| 37 13 580 | 11/1988 | (DE) . |
| 41 13 539 | 10/1991 | (DE) . |
| 44 08 349 | 10/1994 | (DE) . |
| 2 056 017 | 3/1981 | (GB) . |

* cited by examiner

Primary Examiner—Matthew C. Graham
(74) Attorney, Agent, or Firm—Marshall, O'Toole, Gerstein, Murray & Borun

(57) ABSTRACT

A braking system, particularly for use in a motor vehicle includes a hydrodynamic retarder having a stator blade wheel and a rotor blade wheel. A line system through which flows a working fluid of the retarder includes the retarder as well as a cooler. The retarder further includes an inlet throttle and/or an outlet throttle. Measures are taken to keep the braking momentum of the retarder below the full value during the turning on of the retarder.

11 Claims, 13 Drawing Sheets

Fig.1.1
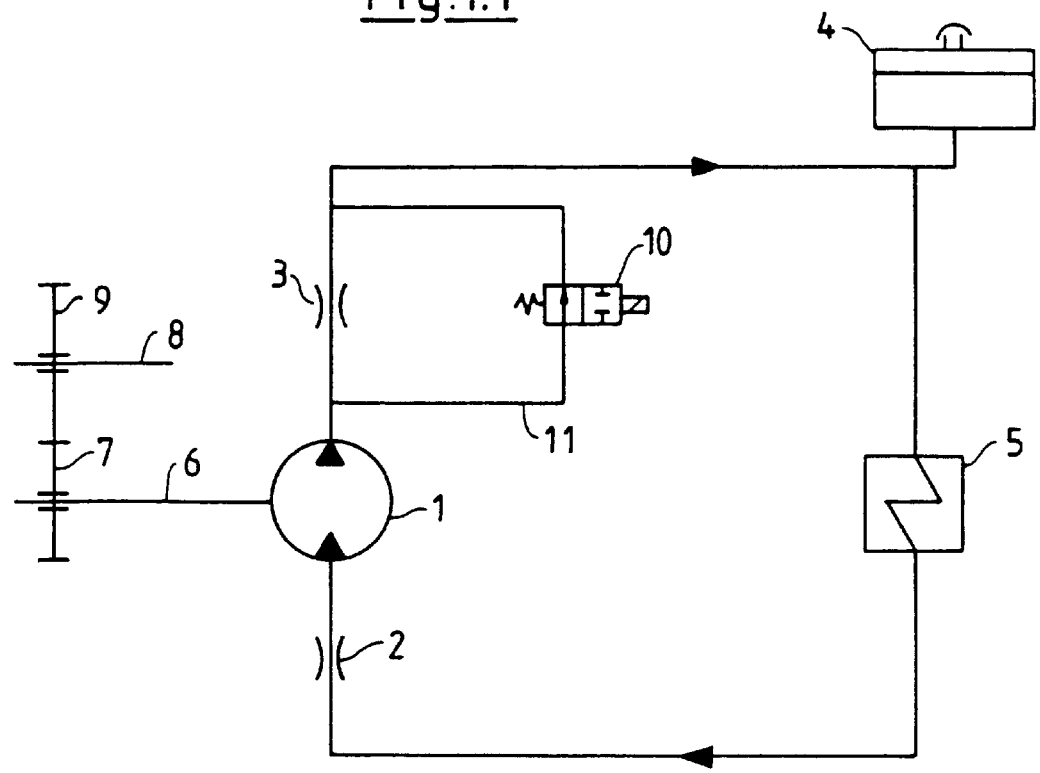
Fig.1.2
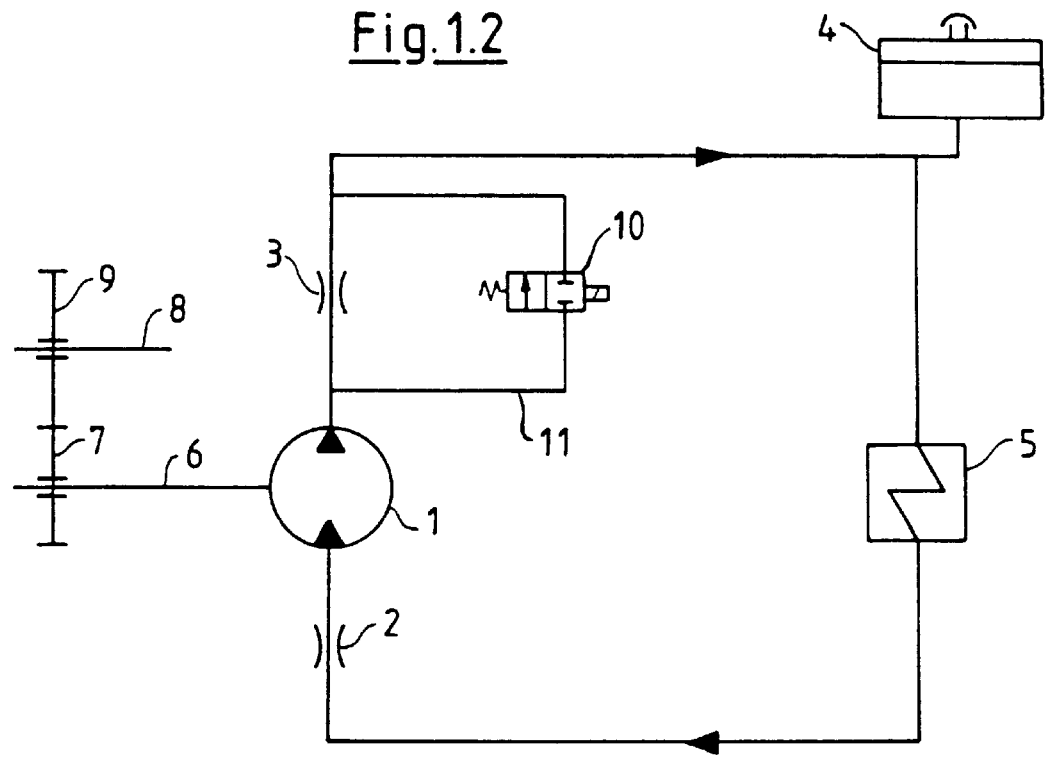

Fig.2.1
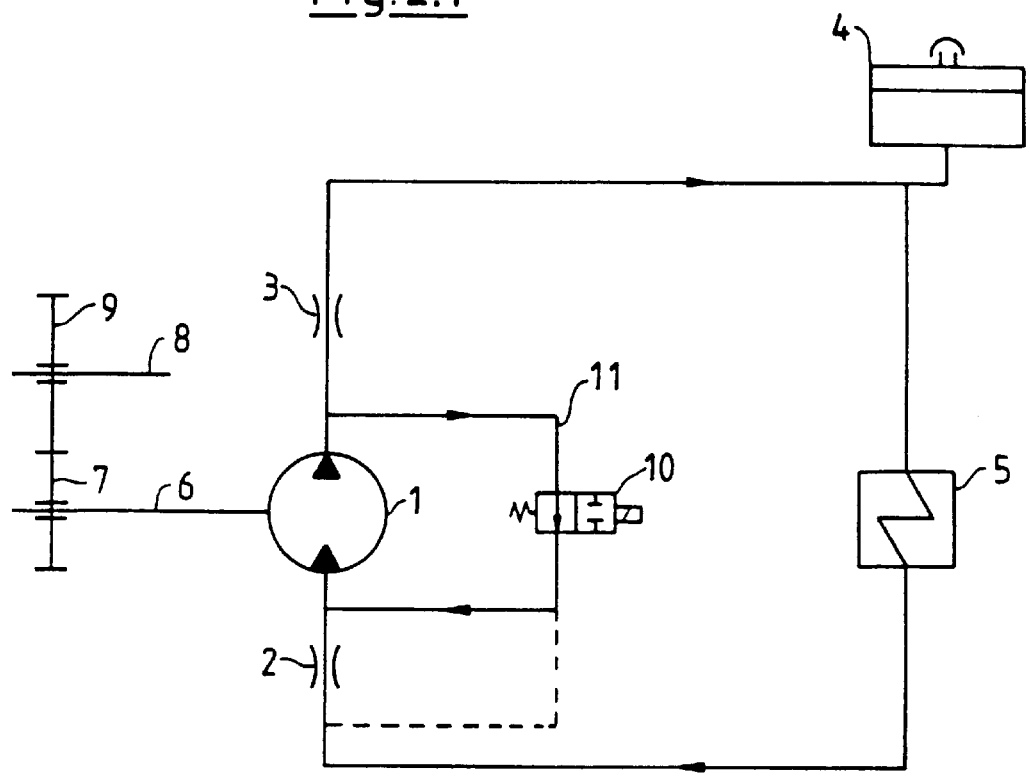
Fig.2.2
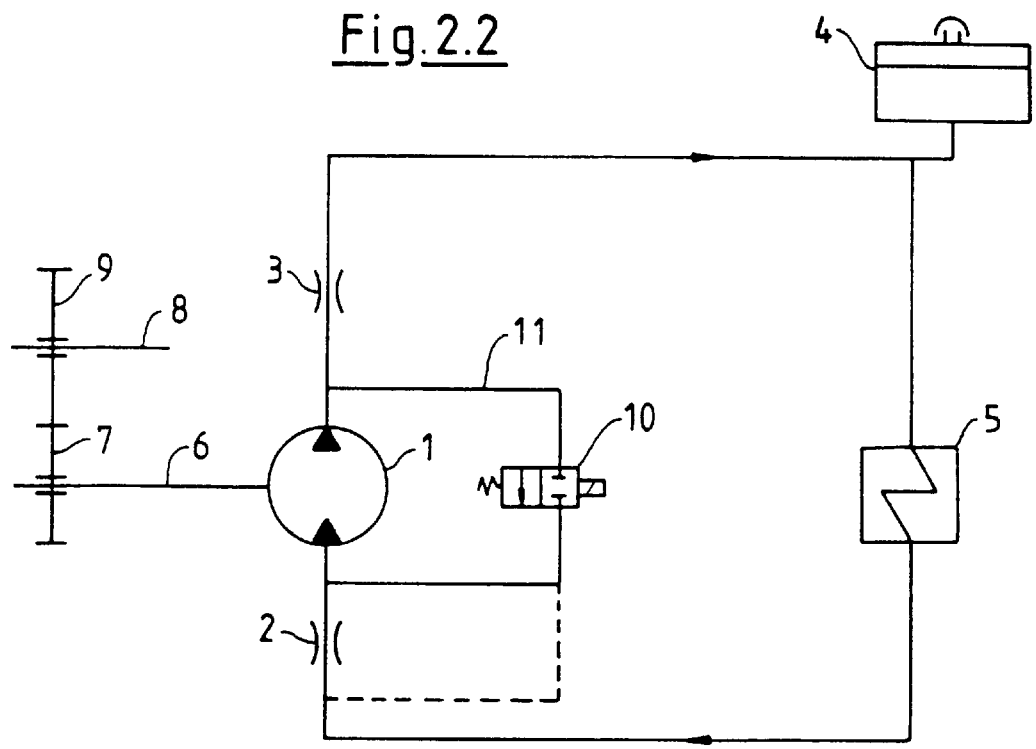

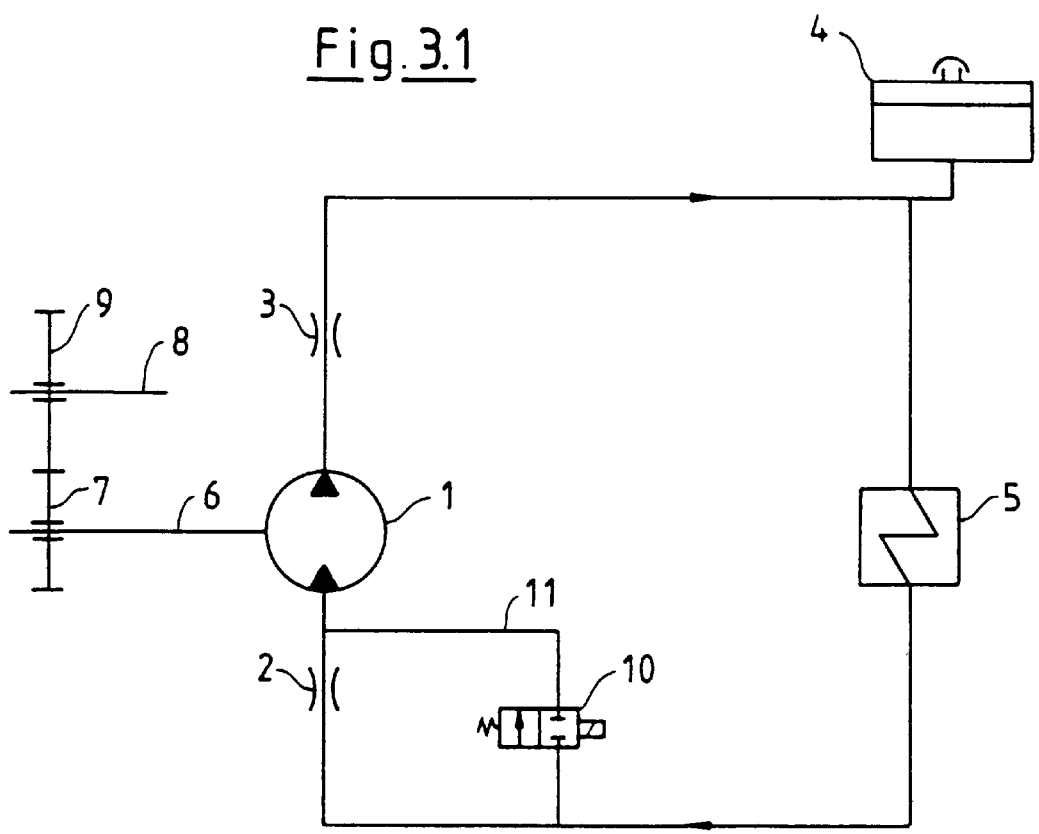
Fig. 3.1
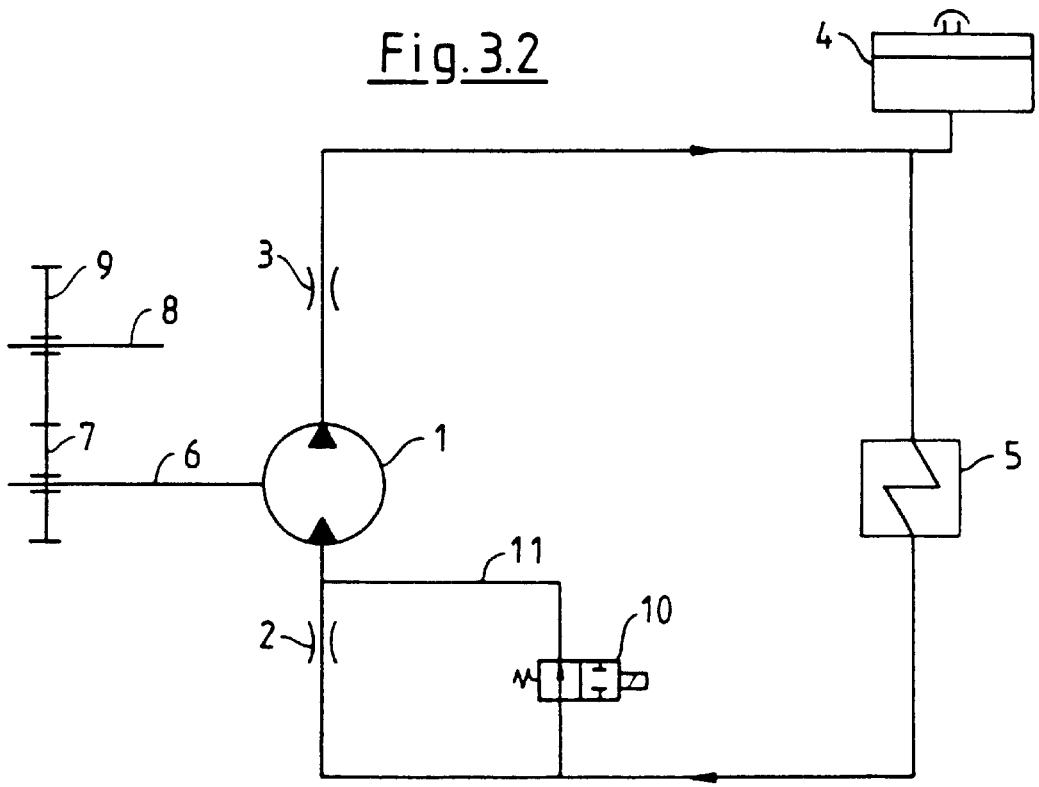
Fig. 3.2

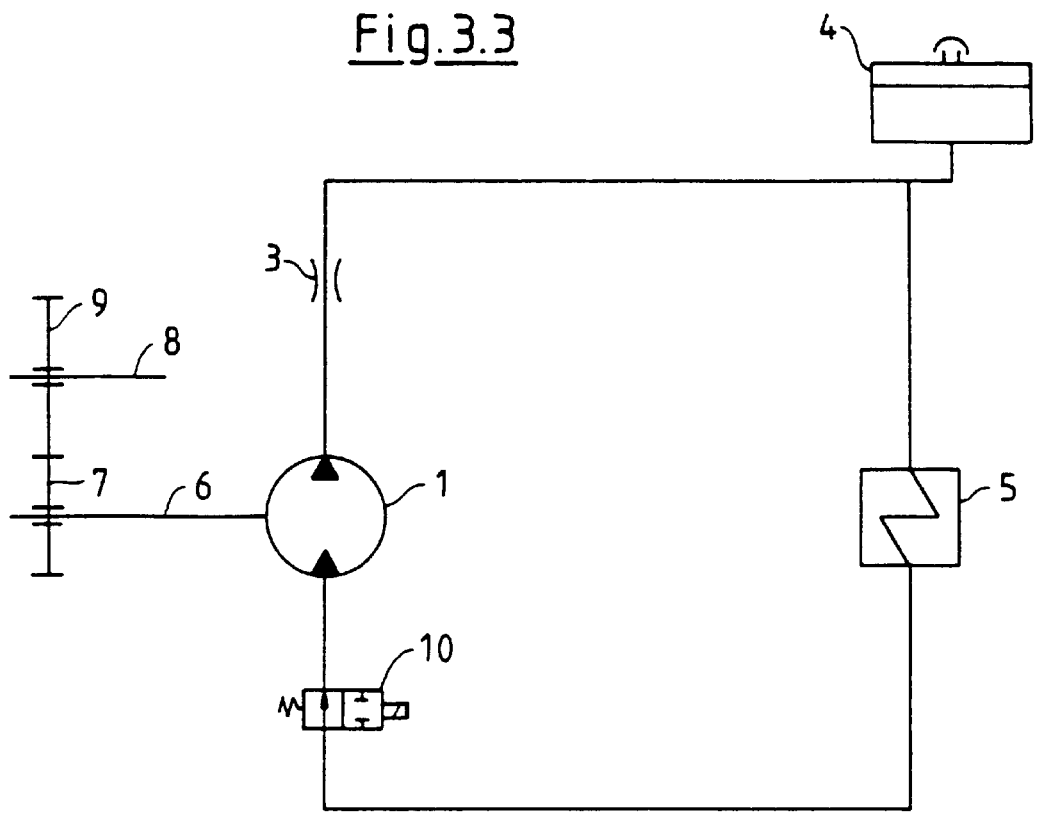
Fig. 3.3
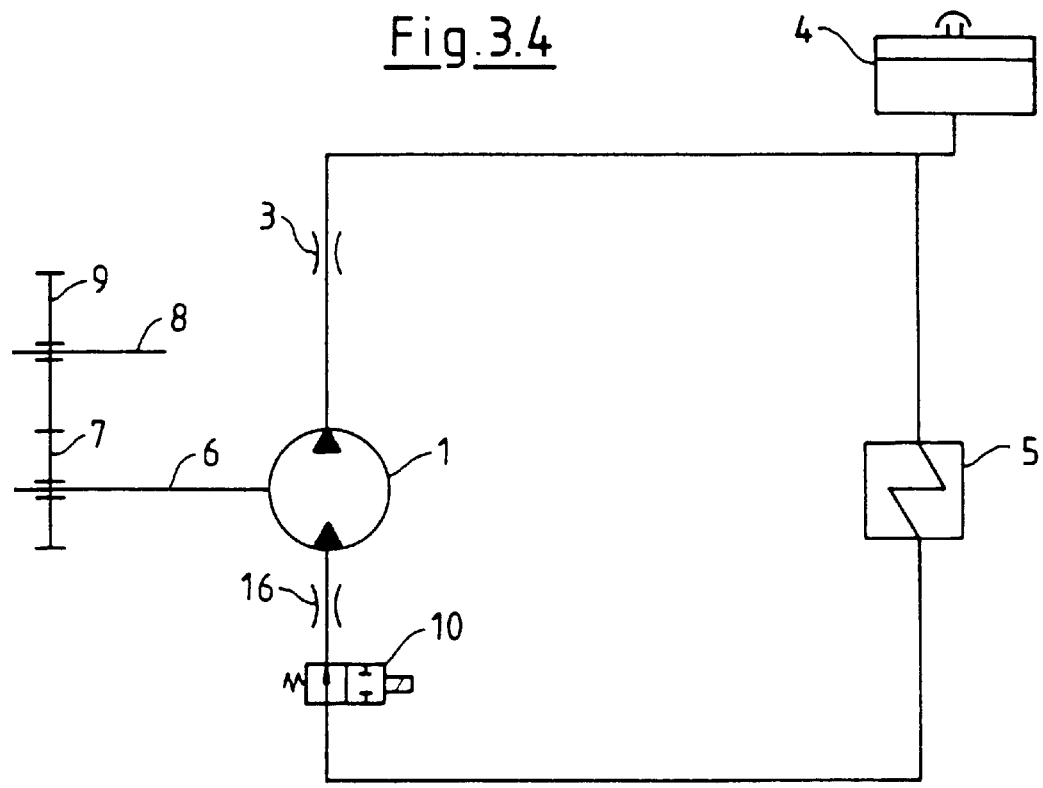
Fig. 3.4

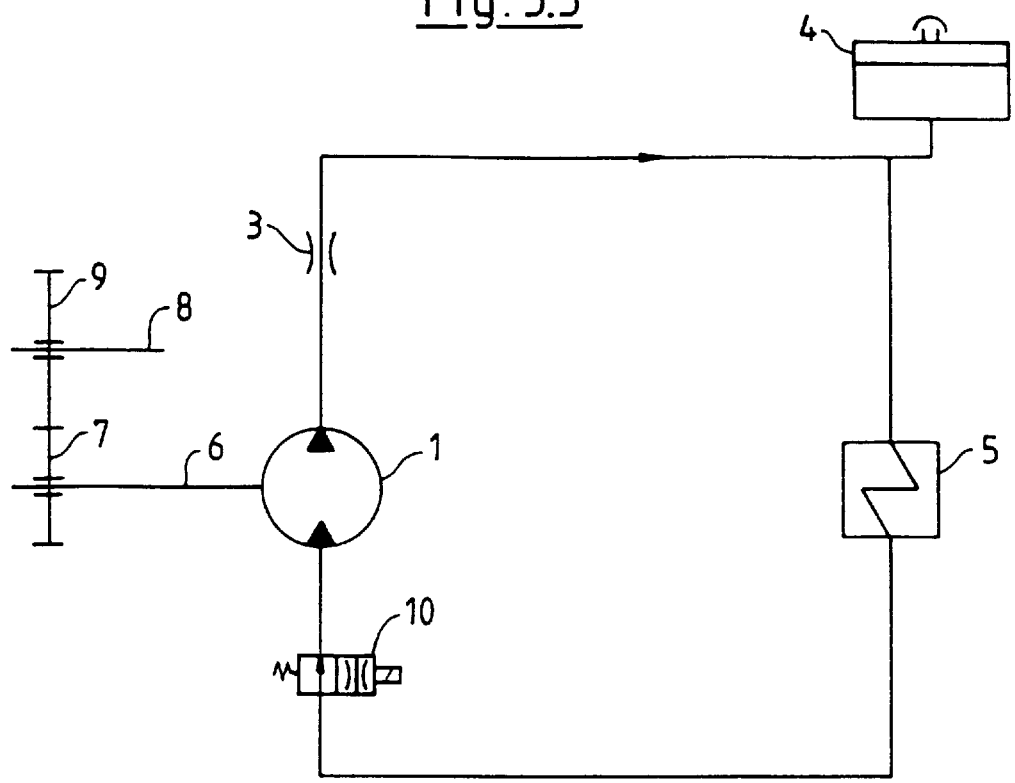
Fig. 3.5
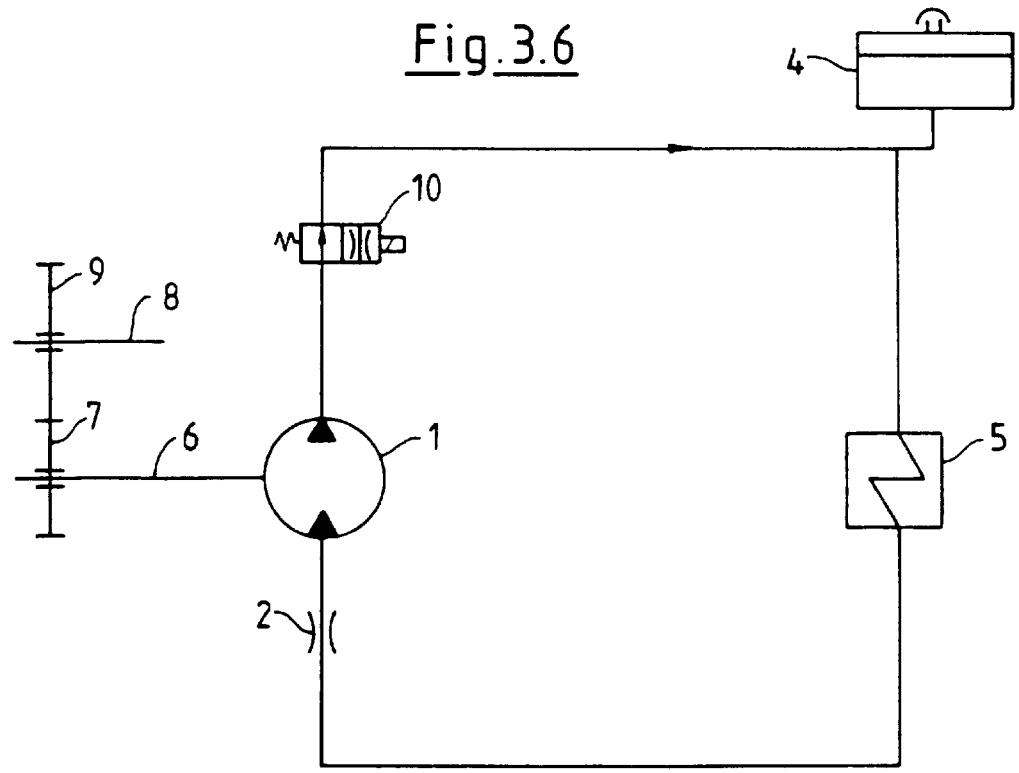
Fig. 3.6

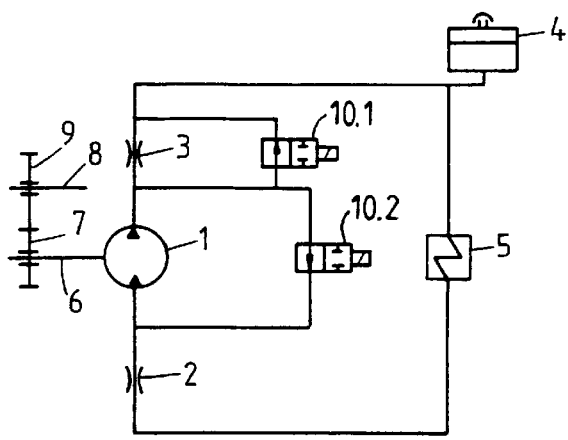
Fig. 7.1
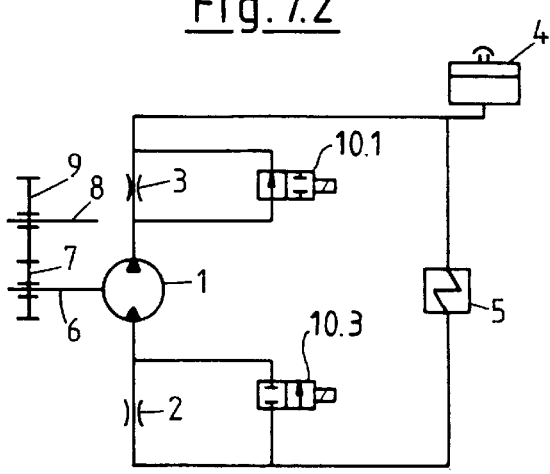
Fig. 7.2
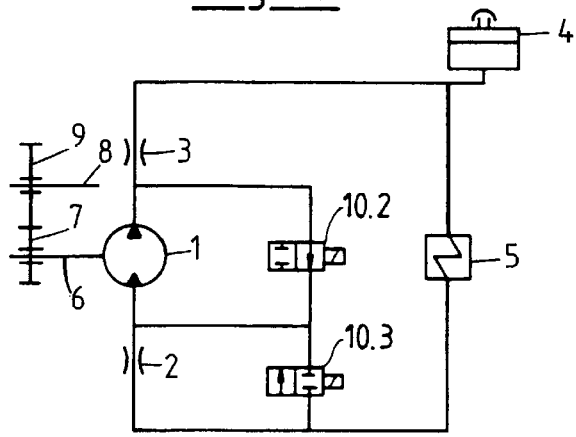
Fig. 7.3
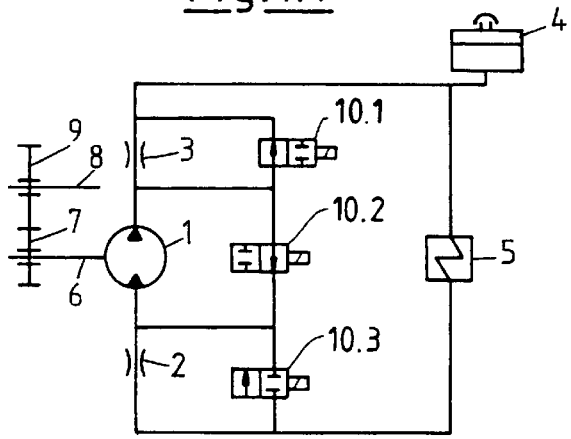
Fig. 7.4

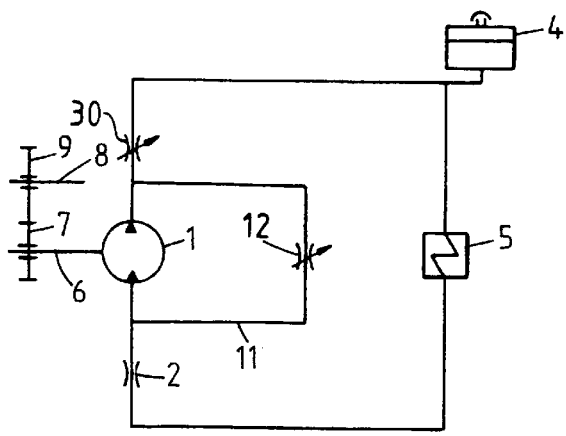
Fig. 8.1
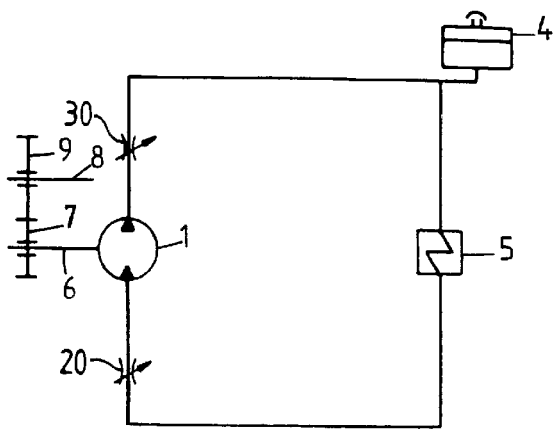
Fig. 8.2
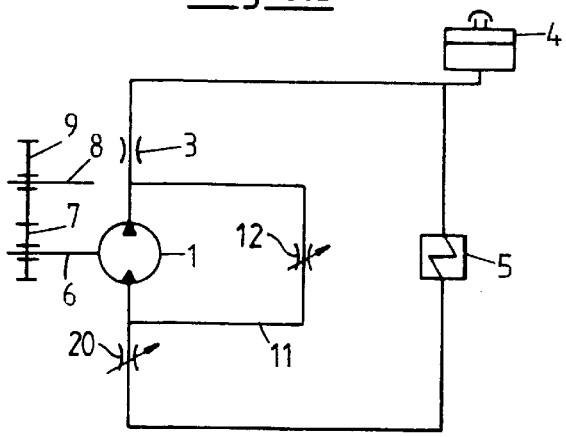
Fig. 8.3
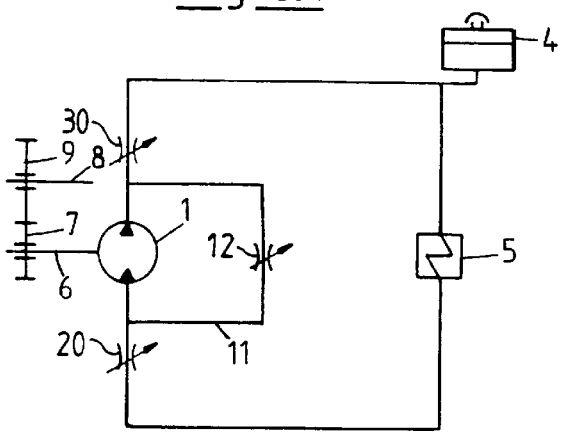
Fig. 8.4

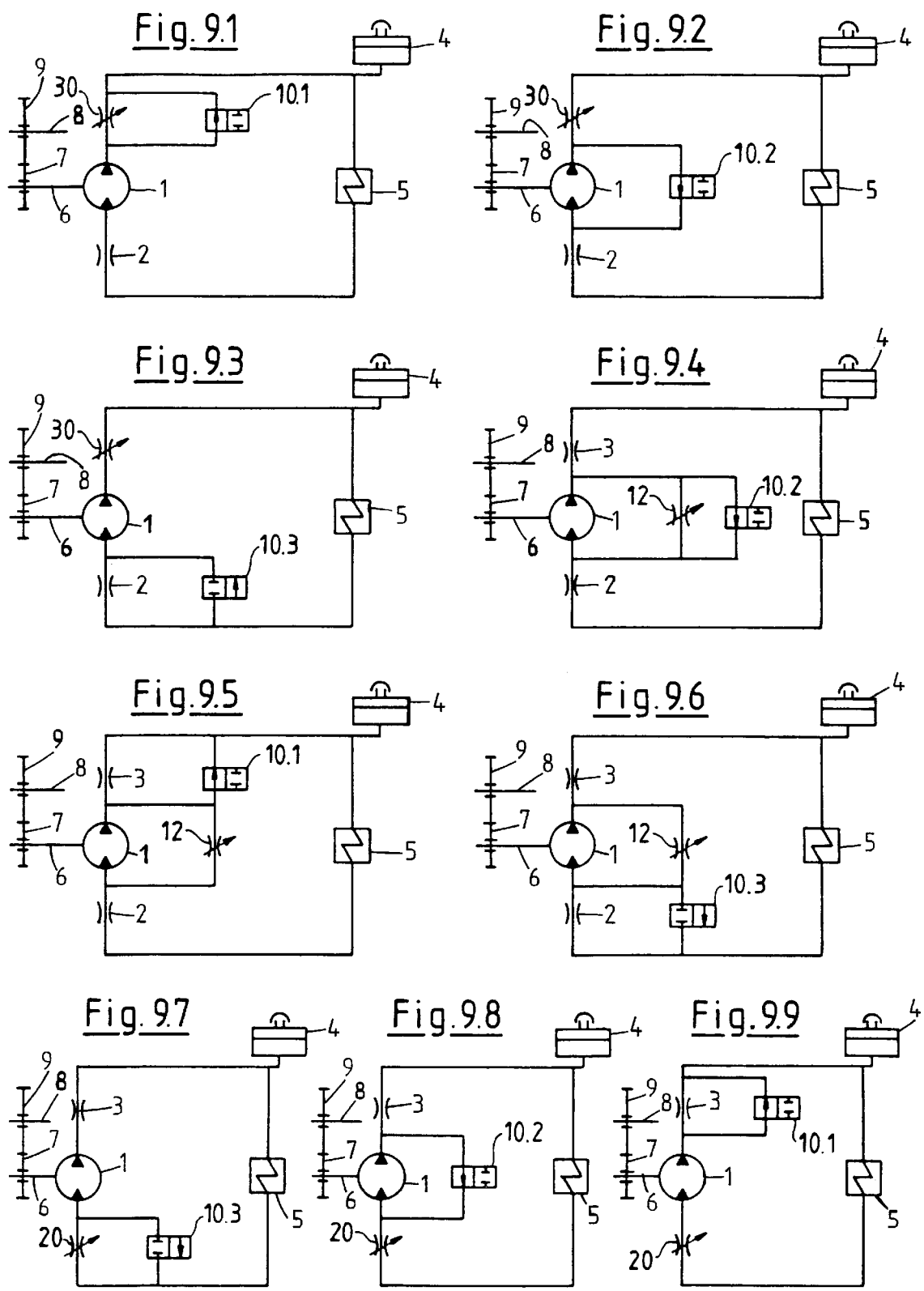

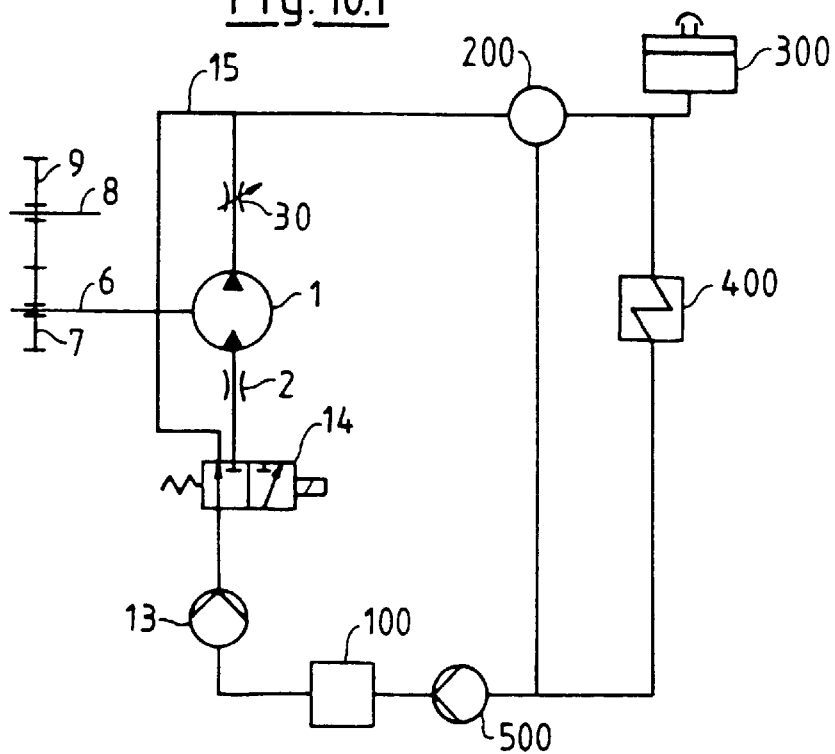
Fig. 10.1
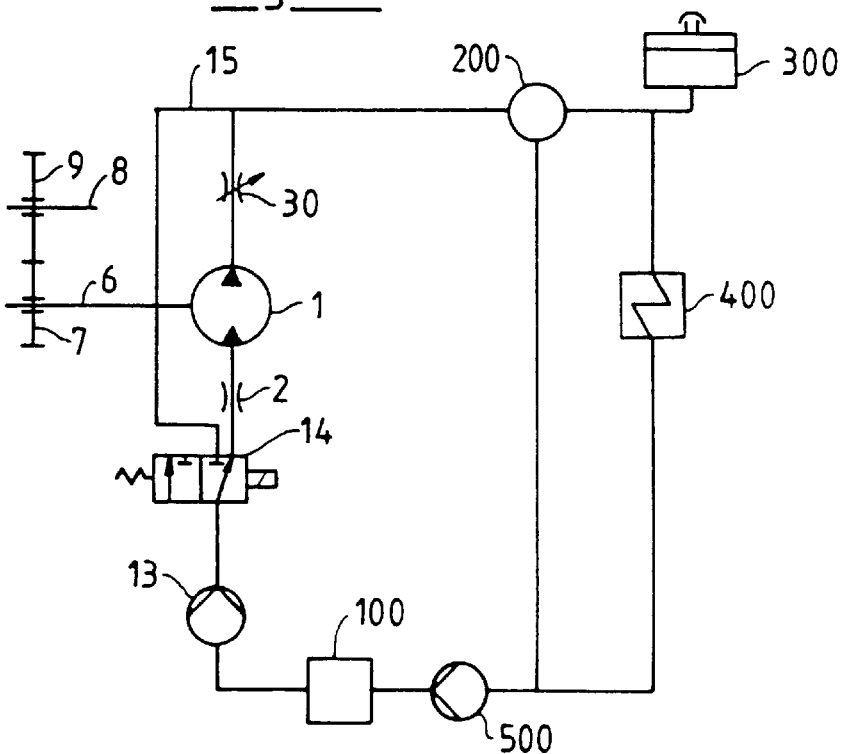
Fig. 10.2

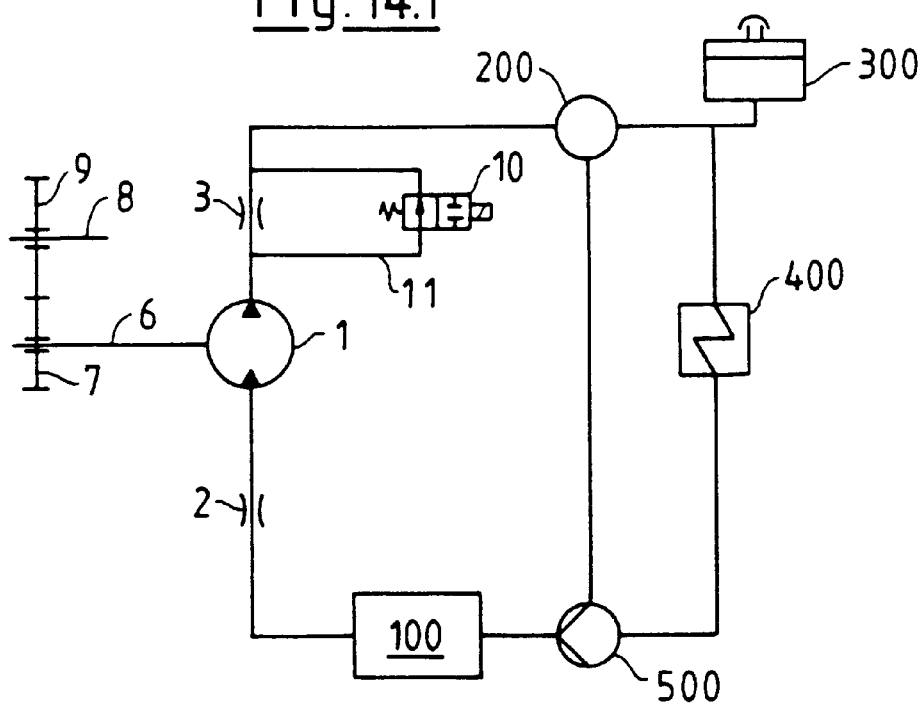
Fig. 14.1
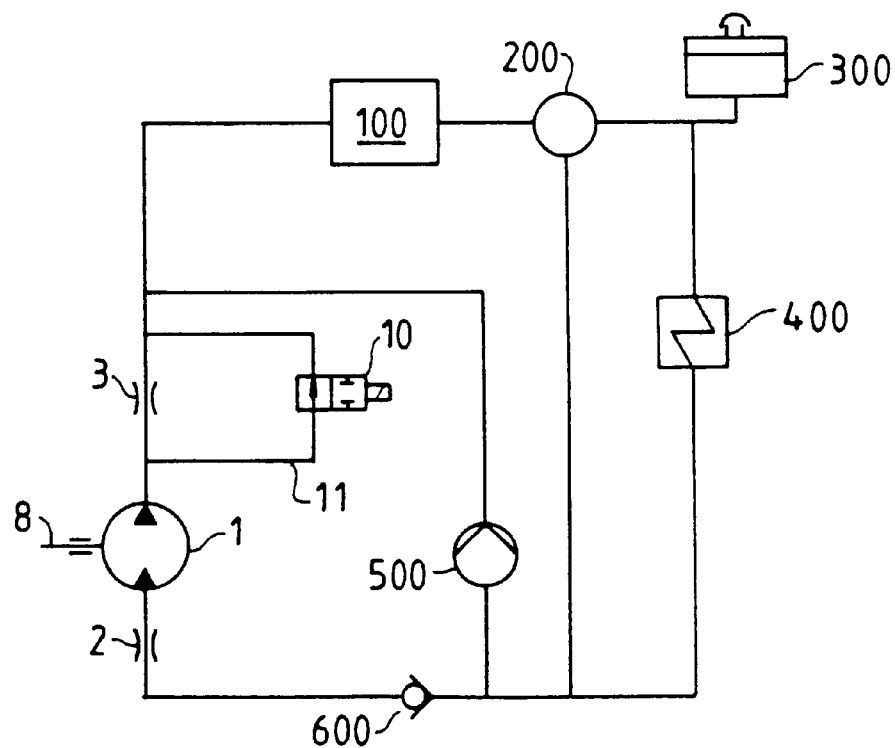
Fig. 14.2

BRAKING SYSTEM WITH A HYDRODYNAMIC RETARDER

BACKGROUND OF THE INVENTION

1. Field of the Invention

The invention relates to braking devices having a hydrodynamic retarder, especially for such devices used in a motor vehicle.

2. Description of Related Technology

It is known to equip braking installations with hydrodynamic retarders. Such retarders may be switchable and include a stator blade wheel and a rotor blade wheel. A line system carries working fluid of the retarder and contains the retarder as well as a cooler. The retarder may include an inlet throttle and/or an outlet throttle. Such braking installations have become known from a number of publications. For example, reference is made to the following:

(1) DE 37 13 580 C1;
(2) DE-AS 1 946 167;
(3) U.S. Pat. No. 4,726,255; and
(4) U.S. Pat. No. 3,720,372.

Retarders are used in heavy vehicles, especially to take up the kinetic braking energy and convert it into heat, especially during braking from high velocities (matching braking). However, retarders are also well-suited for a required continuous braking performance, for example, at a constant velocity of 30 km/h and at a gradient of 7%. The brake fluid is usually oil. The heat transferred to the operating fluid in the retarder must be transferred to the coolant or to the ambient air with the aid of a special heat exchanger.

One of the numerous problems of such braking systems concerns turning the retarder on and off. An attempt to solve this problem has been to fill the retarder with operating medium only for the purpose of braking, but leaving it otherwise unfilled. Another way in which to deal with this problem is to mechanically turn the retarder on and off in the working line.

In the case of mechanically switched retarders, the rpm of the rotor and the retarder must be adjusted to the rpm of the operating line during engagement. In this way, the mass of the rotor is accelerated and at the same time (that is, during the switching), the braking momentum is transferred.

All known switched braking systems have the disadvantage that there is considerable switching work related to switching the retarder on and off. This leads to wear of the participating components and furthermore to a structure of relatively large volume, for example, because of the couplings necessary for such a structure. The constructional expenditure is relatively high. Furthermore, significant noise may occur during the switching process. Switching shocks during turning on and off of the retarder may be especially unpleasant.

SUMMARY OF THE INVENTION

It is an object of the invention to overcome one or more of the problems described above. It is also an object of the invention to provide a switch to braking system which requires relatively small switching work, has a structure with low volume, has simple construction and permits shock-free switching.

A braking system according to the invention includes a switchable hydrodynamic retarder having a stator blade wheel and a rotor blade wheel. The system further includes a line system for carrying a working fluid of the retarder, the retarder being disposed in the line system. A cooler also is disposed in the line system. The system further includes an inlet throttle and/or an outlet throttle. According to the invention, measures are taken for keeping the braking momentum of the retarder below a full value thereof during a turning-on process of the retarder.

Other objects and advantages of the invention will be apparent to those skilled in the art from the following detailed description taken in conjunction with the drawings and the appended claims.

BRIEF DESCRIPTION OF THE DRAWINGS

FIG. 1.1 is a schematic view of a braking system according to the invention shown in a first mode of operation.

FIG. 1.2 is a schematic view of the braking system of FIG. 1.1 shown in a second mode of operation.

FIG. 2.1 is a schematic view of a second embodiment of a braking system according to the invention shown in a first mode of operation.

FIG. 2.2 is a schematic view of the braking system of FIG. 2.1 shown in a second mode of operation.

FIG. 3.1 is a schematic view of a third embodiment of a braking system according to the invention shown in a first mode of operation.

FIG. 3.2 is a schematic view of the braking system of FIG. 3.1 shown in a second mode of operation.

FIG. 3.3 is a schematic view of a fourth embodiment of a braking system according to the invention.

FIG. 3.4 is a schematic view of a fifth embodiment of a braking system according to the invention.

FIG. 3.5 is a schematic view of a sixth embodiment of a braking system according to the invention.

FIG. 3.6 is a schematic view of a seventh embodiment of a braking system according to the invention.

FIG. 7.1 is a schematic view of an eleventh embodiment of a braking system according to the invention.

FIG. 7.2 is a schematic view of a twelfth embodiment of a braking system according to the invention.

FIG. 7.3 is a schematic view of a thirteenth embodiment of a braking system according to the invention.

FIG. 7.4 is a schematic view of a fourteenth embodiment of a braking system according to the invention.

FIG. 8.1 is a schematic view of a fifteenth embodiment of a braking system according to the invention.

FIG. 8.2 is a schematic view of a sixteenth embodiment of a braking system according to the invention.

FIG. 8.3 is a schematic view of a seventeenth embodiment of a braking system according to the invention.

FIG. 8.4 is a schematic view of an eighteenth embodiment of a braking system according to the invention.

FIG. 9.1 is a schematic view of a nineteenth embodiment of a braking system according to the invention.

FIG. 9.2 is a schematic view of a twentieth embodiment of a braking system according to the invention.

FIG. 9.3 is a schematic view of a twenty-first embodiment of a braking system according to the invention.

FIG. 9.4 is a schematic view of a twenty-second embodiment of a braking system according to the invention.

FIG. 9.5 is a schematic view of a twenty-third embodiment of a braking system according to the invention.

FIG. 9.6 is a schematic view of a twenty-fourth embodiment of a braking system according to the invention.

FIG. 9.7 is a schematic view of a twenty-fifth embodiment of a braking system according to the invention.

FIG. 9.8 is a schematic view of a twenty-sixth embodiment of a braking system according to the invention.

FIG. 9.9 is a schematic view of a twenty-seventh embodiment of a braking system according to the invention.

FIG. 10.1 is a schematic view of a twenty-eighth embodiment of a braking system according to the invention shown in a first mode of operation.

FIG. 10.2 is a schematic view of the braking system of FIG. 10.1 shown in a second mode of operation.

FIG. 14.1 is a schematic view of a thirty-second embodiment of a braking system according to the invention.

FIG. 14.2 is a schematic view of a thirty-third embodiment of a braking system according to the invention.

DETAILED DESCRIPTION OF THE INVENTION

Figure 4:
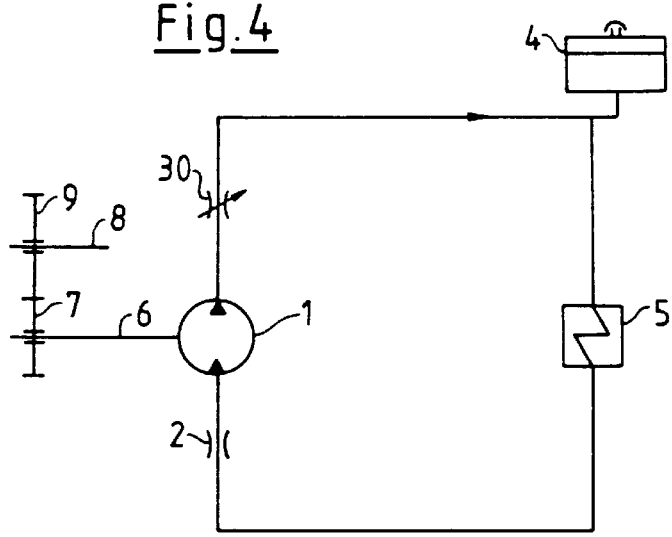
FIG. 4 is a schematic view of an eighth embodiment of a braking system according to the invention.

According to the invention, a switched braking system has been created in which the maximum attainable retarder momentum in rotational operation during coupling in the retarder is reduced. The retarder is not emptied, however, during the switching process, working medium flows through it to a changed degree or not at all. Thus, any additional constructional expenditure is extremely low. Since the retarder momentum is correspondingly reduced during switching, the mechanical power switching elements required for the synchronization of the rotor blade wheel and the drive shaft can be designed correspondingly smaller and thus undergo less wear as a result of the reduced switching work.

With a system according to the invention, it is possible, with the aid of conventional mechanical power switching elements, (for example, synchronizing rings combined with a claw clutch) to couple a braking system in the driving control system train of a vehicle protectively with a power much greater than the maximum in braking operation than if it was mechanically switchable.

The invention is explained in more detail with the aid of the drawing FIGS. 1.1 through 14.2 (a total of 37 figures). Each of these figures shows a loop of a hydrodynamic retarder braking system according to the invention. In all of the figures, elements of the braking system having the same function are given the same reference numerals which are as follows:

1 retarder;
2 inlet throttle;
3 outlet throttle;
4 equalization reservoir;
5 cooler;
6 retarder shaft;
7 pinion;
8 transmission-driven shaft;
9 toothed gear;
10 two/two way valve; and
11 bypass line.

Thus, with respect to FIG. 1.1, a loop of a hydrodynamic retarder braking system according to the invention includes a retarder 1, an inlet throttle 2, an outlet throttle 3, an equalization reservoir 4 and a cooler 5. A pinion 7 sits on a retarder shaft 6 and meshes with a toothed gear 9, which in turn is wedged on a transmission-driven shaft 8.

According to the invention, a bypass line 11 is provided with which the outlet throttle 3 can be bypassed. There is a two/two-way valve 10 in the bypass line 11. With the aid of the valve 10, the bypass line 11 can be opened to various degrees, as shown in FIG. 1.1. Thus, working fluid also flows through the bypass line 11 and not only through the outlet throttle 3. In this way, the braking momentum produced by the retarder 1 can be correspondingly reduced. This process advantageously avoids large switching work.

FIG. 1.2 shows the same embodiment according to the invention as FIG. 1.1, but with the two/two-way valve 10 closed. Thus, as shown in FIG. 1.2, the working fluid flows entirely through the outlet throttle 3. The retarder 1 shown in FIG. 1.2 thus produces a correspondingly high braking momentum.

In the embodiment according to the invention shown in FIGS. 2.1 and 2.2, the hydrodynamic retarder system is composed of the same components as shown in FIGS. 1.1 and 1.2. However, in FIGS. 2.1 and 2.2, the bypass line 11 is arranged in such a way that the retarder 1 can be operated short-circuited. The two/two-way valve 10 is then switched between the inlet throttle 2 and the outlet throttle 3. The function and mode of operation of the valve 10 is otherwise identical with the embodiment according to FIGS. 1.1 and 1.2. If the valve 10 is open, then the inlet and outlet of the retarder 1 is short-circuited and working fluid flows through the bypass line 11. If the cross-section of the bypass line 11 has sufficiently large dimensions, then the working fluid flows almost exclusively through the bypass line 11. Thus the retarder works as a pump with high throughput but low flow resistance, and takes up correspondingly little power. This state is shown in FIG. 2.1. An alternative solution that can be considered is to include the inlet throttle 2 in the short circuit as shown in phantom in FIGS. 2.1 and 2.2.

An advantage of the embodiment of the invention shown in FIGS. 2.1 and 2.2 is the same as the embodiment of the invention shown in FIGS. 1.1 and 1.2. Switching of the retarder is done elegantly (i.e., in an advanced, but uncomplicated manner) without a large work requirement.

An embodiment according to the invention shown in FIGS. 3.1 and 3.2 show a hydrodynamic retarder system composed of the same components as shown in FIGS. 1.1 and 1.2 with the exception that the bypass line 11 is disposed differently. In FIGS. 3.1 and 3.2, the inlet throttle 2 can be bypassed with the aid of the bypass line 11 and the power can be out put through the valve 10. Here, the valve 10, with its relatively large cross-section, represents the active throttle during a braking operation. The inlet throttle 2 has a very small cross-section (i.e. small cross-sectional area) with correspondingly high flow resistance.

As shown in FIG. 3.1, if the valve 10 is in the closed position, then the working fluid can flow only through the inlet throttle 2. Due to the above-mentioned high retarder inlet resistance and the consequently low working fluid throughput, the retarder 1 produces only a small braking momentum. If the inlet throttle 2 is completely closed, then the braking momentum goes to a minimum.

The situation is different in the open position of the valve 10 according to FIG. 3.2. Here the working fluid flows through the valve 10 so that a maximum braking momentum is produced.

As an alternative to the embodiment of the invention shown in FIGS. 3.1 and 3.2, it is also possible to omit the throttle 2 and the bypass line 11 completely and, instead of this, to incorporate the valve 10 directly into the retarder inlet line. In such an embodiment, if the valve 10 is open, as shown in FIG. 3.3, the retarder 1 receives the full amount of working fluid and therefore develops a full braking momentum. If the valve 10 is closed, the retarder receives no working fluid so that the braking momentum falls to a minimum.

FIG. 3.4 shows an alternative to the mbodiment according to FIG. 3.3. Here, a throttle 16 s connected downstream from the valve 10. The system according to the invention shown in FIG. 3.4 has the following advantages:

The throttle 16 can have a smaller cross-section (and cross-sectional area) than the cross-section (and cross-sectional area) of the valve 10. The pressure is then decreased in the throttle 16 and so does possible cavitation. Thus, the throttle 16 has a protective function toward the much more expensive valve 10. Another advantage is that if any exchange become necessary or if the cross-section has to be adapted, the cheaper throttle can be made available as a variable part (a part that can be replaced or changed).

In contrast to the embodiments of the invention described with respect to FIGS. 1.1, 1.2, 2.1, 2.2, 3.1, 3.2, and 3.3, here, the active cross-section is determined by the throttle 16.

In an embodiment according to the invention shown in FIG. 3.5, the two/two-way valve 10 is again disposed in the inlet to the retarder. The cross-section necessary for achieving the braking momentum is defined here by the valve 10. The valve 10 can be switched from a "fully open" position into a throttled position.

In an embodiment according to the invention shown in FIG. 3.6, the two/two-way valve 10 is connected downstream of the retarder 1. An inlet throttle 2 is again provided at the inlet side. By appropriate switching of the valve 10, the throughput of working fluid can be either throttled or fully released so that the braking momentum can be adjusted to a maximum and minimum level.

In an embodiment according to the invention shown in FIG. 4, an inlet throttle 2 is again provided.

An outlet throttle 30 is disposed in the outlet line.

This can be controlled, which is decisive. In idling operation, as well as before or during switching of the retarder, the outlet throttle 30 can be opened so wide that a larger cross-section is available and thus the breaking momentum is minimum. After switching, this cross-section can be reduced again to a very small value, so that the braking momentum becomes correspondingly high.

Another advantage of the embodiment shown in FIG. 4 lies in the possibility of increasing the braking momentum gently so that sudden momentum changes are avoided. This protects all the incorporated component parts. In addition, in this embodiment, the bypass line 11 is saved (i.e., omitted, not used).

Figure 5:
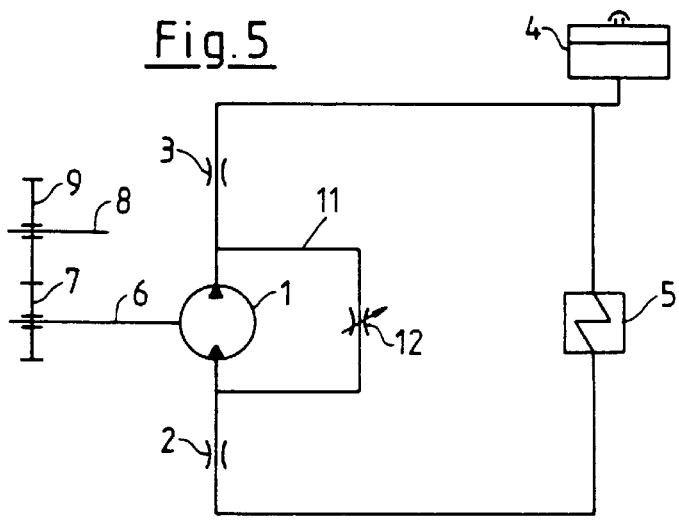
FIG. 5 is a schematic view of a ninth embodiment of a braking system according to the invention.

An embodiment of the invention shown in FIG. is similar to that shown in FIGS. 2.1 and 2.2. However, instead of the valve 10, here a throttle 12 is provided in the bypass line 11. The decisive aspect is that the throttle 12 can be controlled (i.e. adjusted). The throttle 12 functions and operates essentially identically as the throttle 30 according to the embodiment of the invention shown in FIG. 4. However, as a result of the arrangement in the bypass line 11 shown in FIG. 5, an interesting variation is obtained with regard to the design of the braking momentum change.

Figure 6:
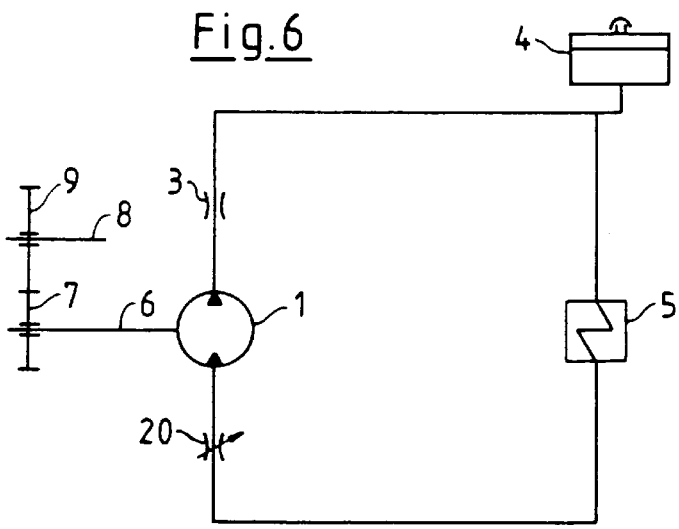
FIG. 6 is a schematic view of a tenth embodiment of a braking system according to the invention.

In an embodiment according to the invention shown in FIG. 6, the inlet throttle 20 is designed as a controllable throttle, while the outlet throttle 3 is again a constant throttle. The inlet throttle 20 has the opposite function as the outlet throttle 30 of the embodiment shown in FIG. 4. This means that the cross-section of the throttle can be reduced to a minimum before or during the switching process. Thus, the fluid stream introduced to the retarder and correspondingly the torque can be minimized in a desired manner. Conversely, the throttle 20 can be opened wide with the opposite consequences.

In the embodiment according to the invention shown in FIG. 4, here, again, we have the advantage that the bypass line 11 is omitted and the costs can be reduced as a result of this.

FIGS. 7.1 to 7.4 show four embodiments of systems according to the invention in which various combinations of two/two-way valves 10.1, 10.2, and 10.3 are used. In these four embodiments, not only the arrangements and switchings are different, but various sizes and various nominal widths of the valves 10.1, 10.2, and 10.3 can be used. All other components are the same or identical with the components of the switching systems shown in the other drawing figures.

FIGS. 8.1 to 8.4 show other possible combinations of control throttles 20, 30, and 12 in braking systems according to the invention. Thus, different control regions can be covered.

FIGS. 9.1 to 9.9 show other possible combinations of control throttles and valves in systems according to the invention. These combinations have the advantage that the control range of the individual throttles can be minimized to the maximum necessary range for the braking operation. The cross-section change that occurs during a switching period is assumed by the additionally installed valve. By dividing this to the two valves, the size of the structure can be reduced.

Fundamentally, in the embodiments discussed thus far, the retarder can be operated with any suitable fluid.

FIGS. 10.1 and 10.2 show an embodiment according to the invention which includes a drive system with the retarder system. Here, the components have the same reference numbers as in the previous embodiments, such as, for example, the retarder 1 and the retarder shaft 6, etc. The drive system includes an internal combustion engine 100, which, among other items, has a cooler 400. A water pump 500 is switched upstream of the motor 100 and an additional pump 13 is switched downstream of the motor 100. Furthermore, a thermostat 200 is provided in the system. It is essential in the embodiments shown in FIGS. 10.1 and 10.2 that a three/two-way valve 14 be used which controls a bypass 15. The pump 13 can be disposed on the retarder shaft 6 or on a separate shaft at the transmission outlet.

The pump 13 serves for increasing the coolant throughput during braking operation at high vehicle speed and low motor rpm values. Here, avoidance of increase of torque during the switching operation is done by delaying the switching of the valve 14. This means that the working medium is guided through the bypass 15 immediately before or during the switching process.

After the switching process from the state according to FIG. 10.1 (retarder off) to the state according to FIG. 10.2 (retarder on), gentle control can be achieved additionally with the aid of the throttle 30.

Figure 11:
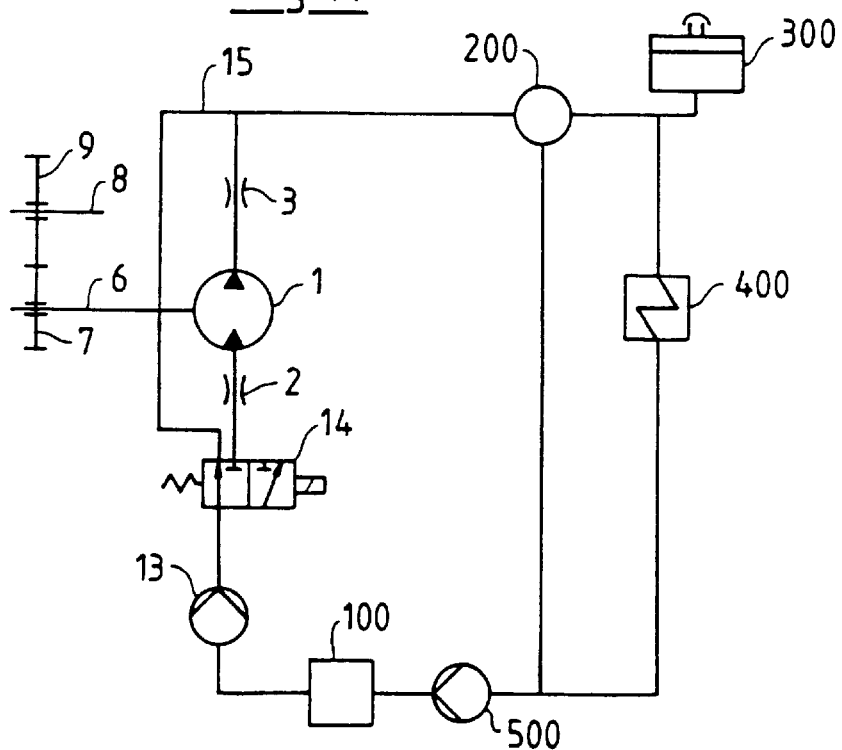
FIG. 11 is a schematic view of a twenty-ninth embodiment of a braking system according to the invention.

The controllable throttle 30 shown in FIGS. 10.1 and 10.2 can also be replaced by a fixed throttle as illustrated in an embodiment according to the invention shown in FIG. 11.

Figure 12:
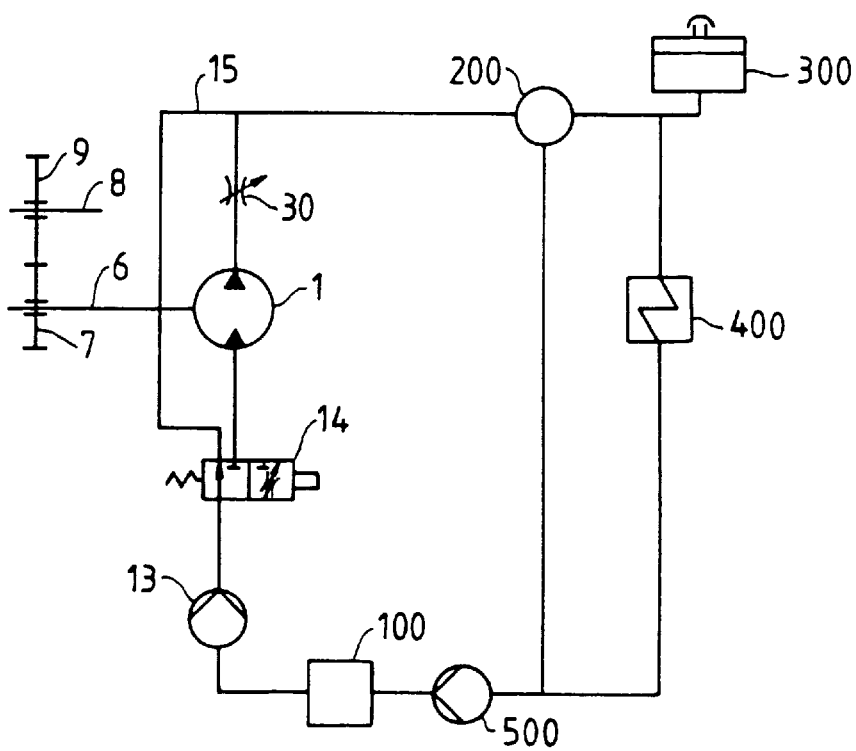
FIG. 12 is a schematic view of a thirtieth embodiment of a braking system according to the invention.

An embodiment according to the invention shown in FIG. 12 is analogous to the embodiment shown in FIGS. 10.1 and 10.2 with the exception that in FIG. 12 the valve 14 assumes the function of the throttle 2.

In an embodiment of the invention shown in FIG. 12, there is again the possibility of providing a constant throttle 3 (not shown) instead of the controllable throttle 30.

Figure 13:
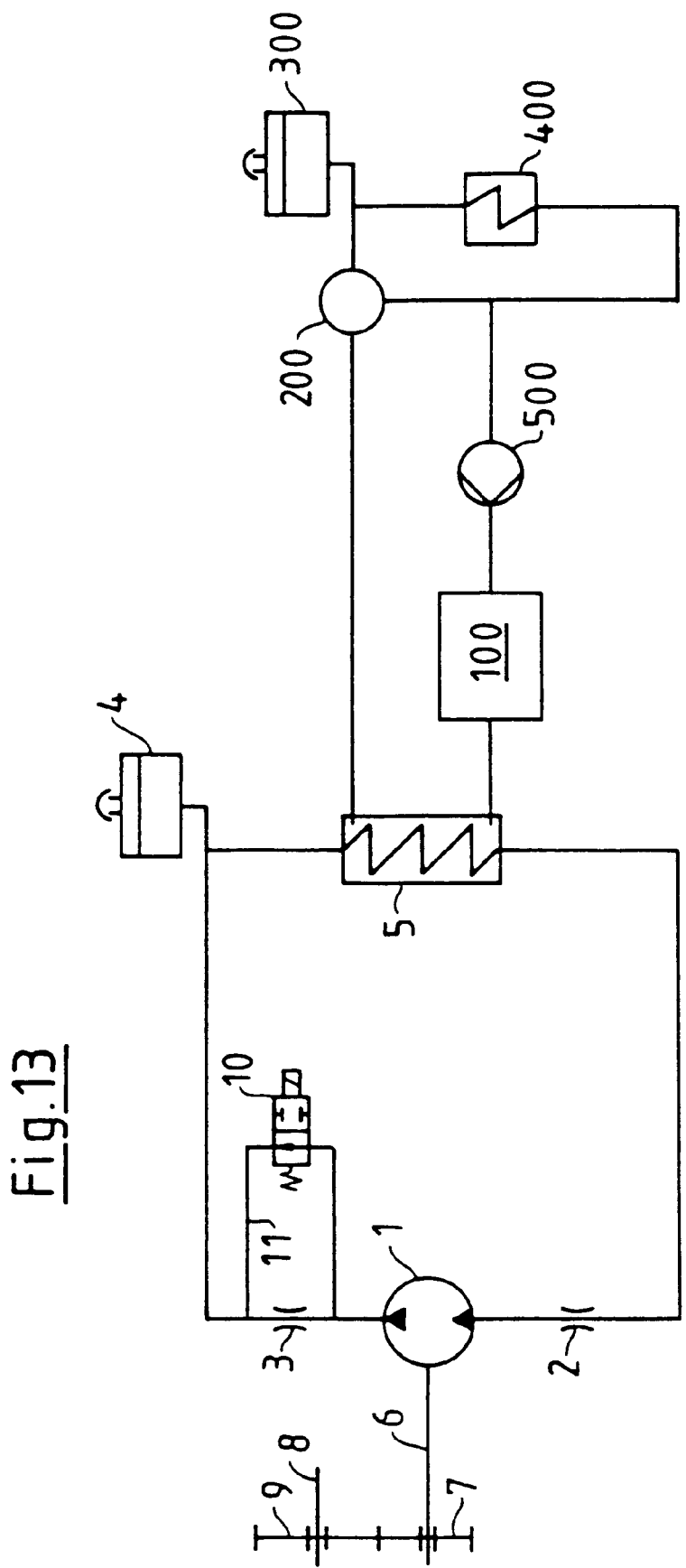
FIG. 13 is a schematic view of a thirty-first embodiment of a braking system according to the invention.

FIG. 13 shows a drive system according to the invention in which a retarder system according to the invention is incorporated into a separate loop. Here the energy exchange occurs through the retarder cooler 5 which releases the braking energy to the coolant of the vehicle. The cooler 5 is located in the cooling loop of the vehicle between the motor outlet and inlet to the thermostat 200. Again, one can see the following parts: the motor 100, the thermostat 200, the equalization reservoir 300, the vehicle cooler 400 as well as the coolant pump 500.

The scheme of a drive system according to the invention shown in FIG. 14.1 illustrates another possibility of incorporating a retarder system of the invention into the cooling loop of a vehicle. Here, coolant flows through the retarder 1, even when there is no braking operation. During a braking operation, the retarder 1 is fed by the coolant pump 500 of the vehicle.

In an embodiment according to the invention shown in FIG. 14.2, which is analogous to the embodiment according to the invention shown in FIG. 1, the retarder 1 is included in the cooling loop and also in the drive train of a vehicle. However, here, the retarder 1 is switched parallel to the coolant pump 500 of the vehicle. The retarder 1 is disposed switchably on the drive shaft 8 or on a separate retarder shaft through an ascent (i.e., upward stroke). The retarder functions as an additional pump during a braking operation (called water pump retarder). Thus, the retarder is self-aspirating and is not fed by the actual water pump. Analogously to the embodiment according to the invention shown in FIG. 14.1, the equalization reservoir 4 and the retarder cooler 5 can be omitted. Additionally, a check valve 600 may be a necessary element of the system.

The foregoing detailed description is given for clearness of understanding only, and no unnecessary limitations should be understood therefrom, as modifications within the scope of the invention will be apparent to those skilled in the art.

What is claimed is:

1. A braking system comprising:
   a switchable hydrodynamic retarder, said retarder switchably connected to a transmission drive shaft;
   a line system for carrying a working fluid of the retarder, said retarder disposed in the line system;
   a cooler disposed in the line system;
   at least one of an inlet throttle and an outlet throttle;
   means for keeping the braking momentum of the retarder below a full value thereof when connecting said retarder to the transmission shaft during a turn-on process of the retarder.

2. The braking system of claim 1 wherein said means for keeping the braking momentum of the retarder below a full value thereof during a turning-on process of the retarder changes the throughput of working fluid through the retarder for the purposes of switching.

3. The braking system of claim 1 wherein said means for keeping the braking momentum of the retarder below a full value thereof during a turning-on process of the retarder comprises a bypass line which bypasses at least one component of the line system.

4. The braking system of claim 3 wherein the bypass line bypasses the retarder.

5. The braking system of claim 4 comprising an inlet throttle and wherein the bypass line bypasses the inlet throttle.

6. The braking system of claim 3 comprising an outlet throttle and wherein the bypass line bypasses the outlet throttle.

7. The braking system of claim 3 comprising and inlet throttle and an outlet throttle and wherein the bypass line bypasses the retarder, and at least one of the inlet throttle and the outlet throttle.

8. The braking system of claim 1 wherein said means for keeping the braking momentum of the retarder below a full value thereof during a turning-on process of the retarder comprises at least two bypass lines which each bypass at least one component of the line system.

9. The braking system of claim 3 wherein the bypass line contains controllable throttle valves.

10. The braking system of claim 9 wherein the throttle valves are switched together with a drive system.

11. The braking system of claim 1 wherein the retarder can be filled and emptied.

* * * * *